United States Patent [19]

Wuenscher

[11] 4,247,251

[45] Jan. 27, 1981

[54] CYCLOIDAL FLUID FLOW ENGINE

[76] Inventor: Hans F. Wuenscher, 2004 Dogwood La., Huntsville, Ala. 35810

[21] Appl. No.: 906,879

[22] Filed: May 17, 1978

Related U.S. Application Data

[63] Continuation-in-part of Ser. No. 767,641, Feb. 10, 1977, abandoned.

[51] Int. Cl.³ .............................................. F03D 7/06
[52] U.S. Cl. ...................................... 416/24; 416/114; 416/119; 416/132 B
[58] Field of Search .................. 416/23, 24, 111, 119, 416/113–115, 139 A, 17, 132 B

[56] References Cited

U.S. PATENT DOCUMENTS

| | | | |
|---|---|---|---|
| 1,556,012 | 10/1925 | Flettner | 416/23 |
| 1,953,444 | 4/1934 | Stalker | 416/41 |
| 3,877,836 | 4/1975 | Tompkins | 416/119 |
| 3,978,345 | 8/1976 | Bailey | 416/111 X |
| 4,048,947 | 9/1977 | Sicard | 416/119 X |
| 4,050,246 | 9/1977 | Bourquardez | 416/240 A |
| 4,052,134 | 10/1977 | Rumsey | 416/119 |
| 4,084,921 | 4/1978 | Norz | 416/17 |
| 4,105,363 | 8/1978 | Loth | 416/23 |
| 4,137,009 | 1/1979 | Telford | 416/24 |

FOREIGN PATENT DOCUMENTS 1003621  3/1952  France ...................................... 416/23

Primary Examiner—Everette A. Powell, Jr.

[57] ABSTRACT

A cycloidal fluid flow engine suitable for turbine and propeller operation, employing blades of aircraft type wing and tail configuration, pitch controllable through the full range of advance ratios by reciprocating control surfaces, guided by an adjustable inclined bearing device on each blade hub, or one such device centrally located on the mainshaft housing.

27 Claims, 19 Drawing Figures

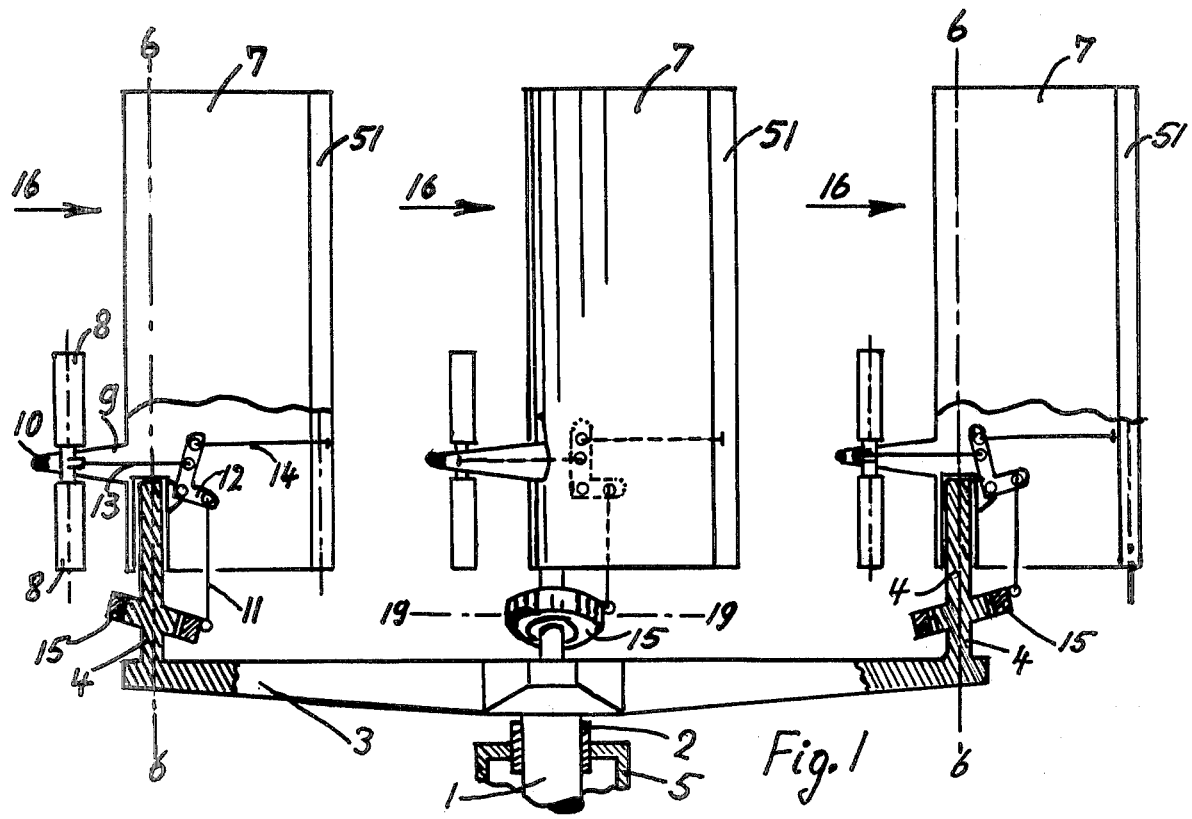
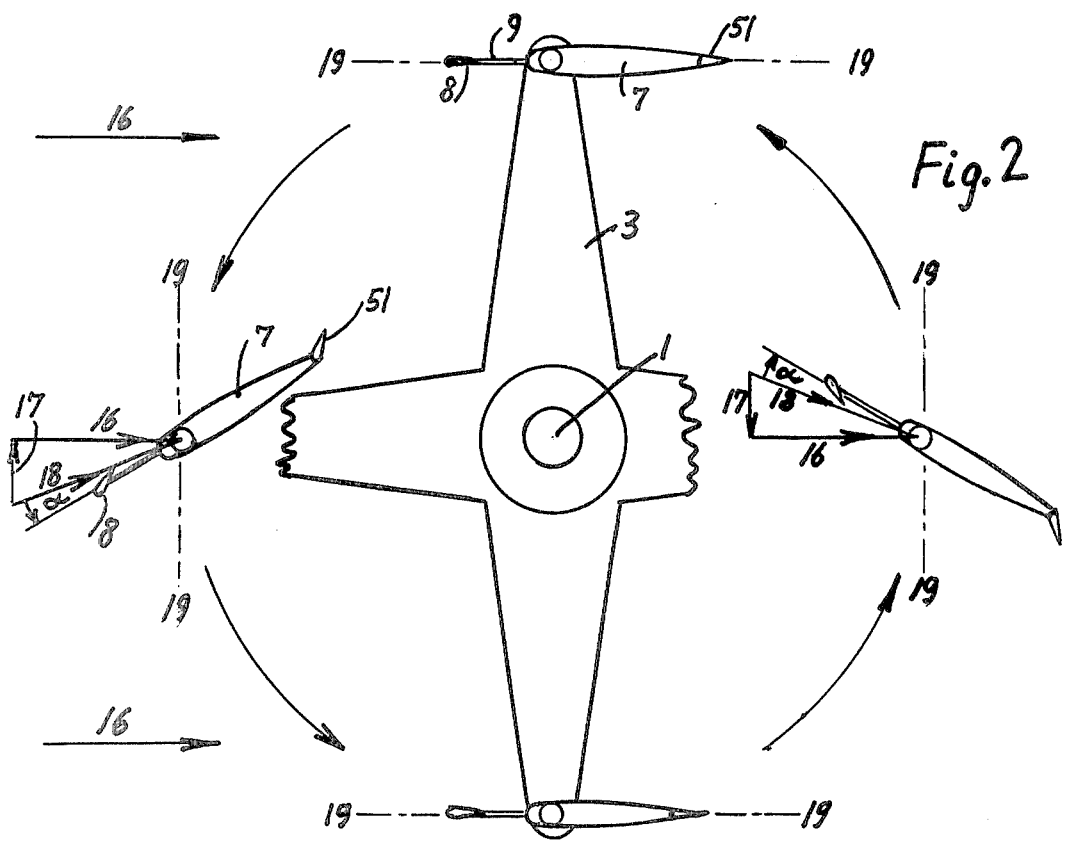

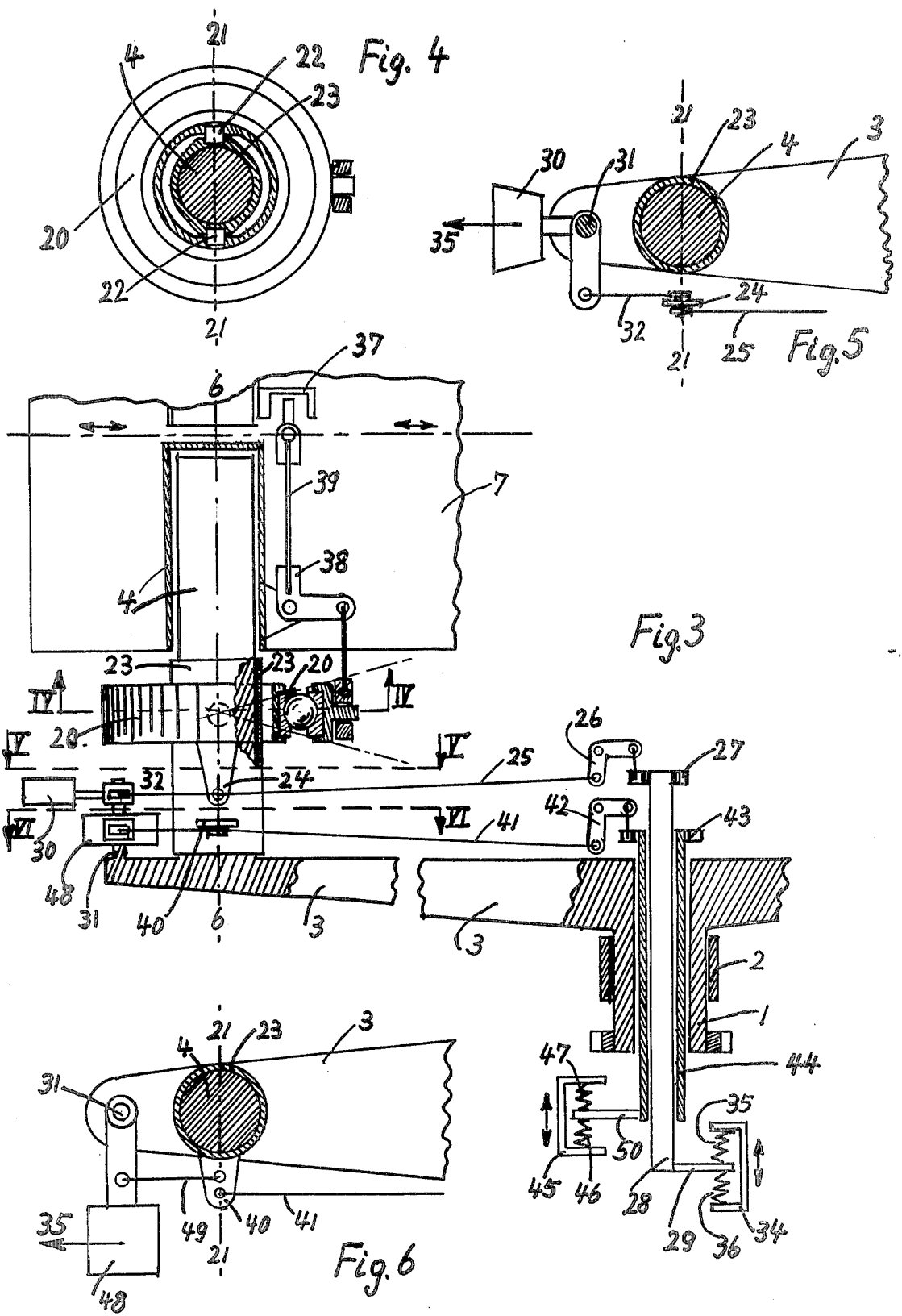

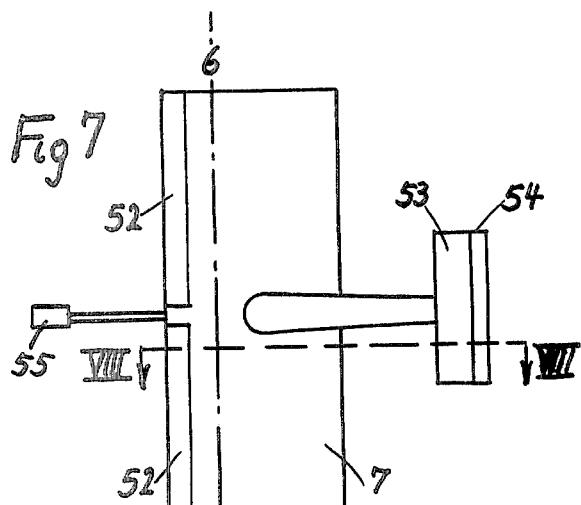
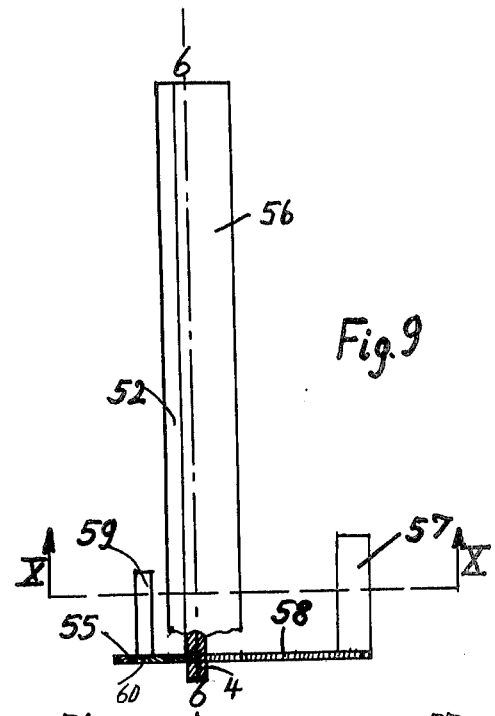
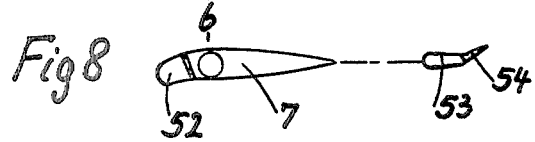
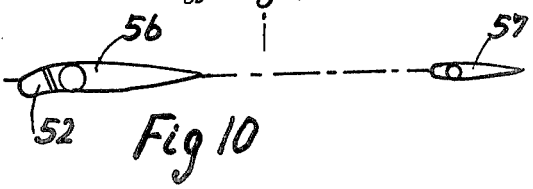
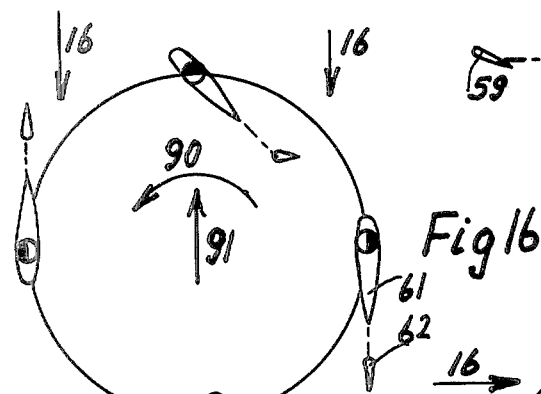
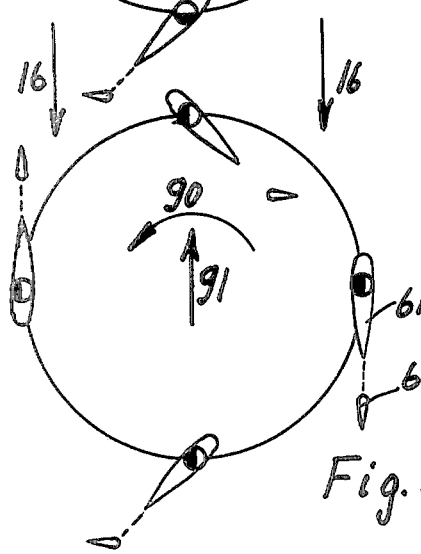
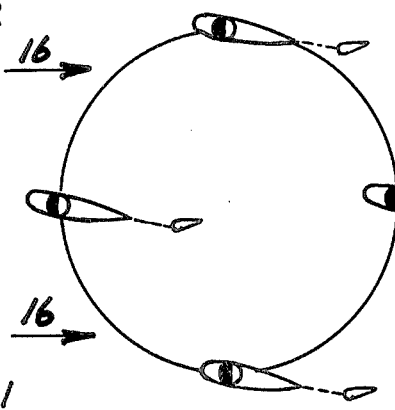

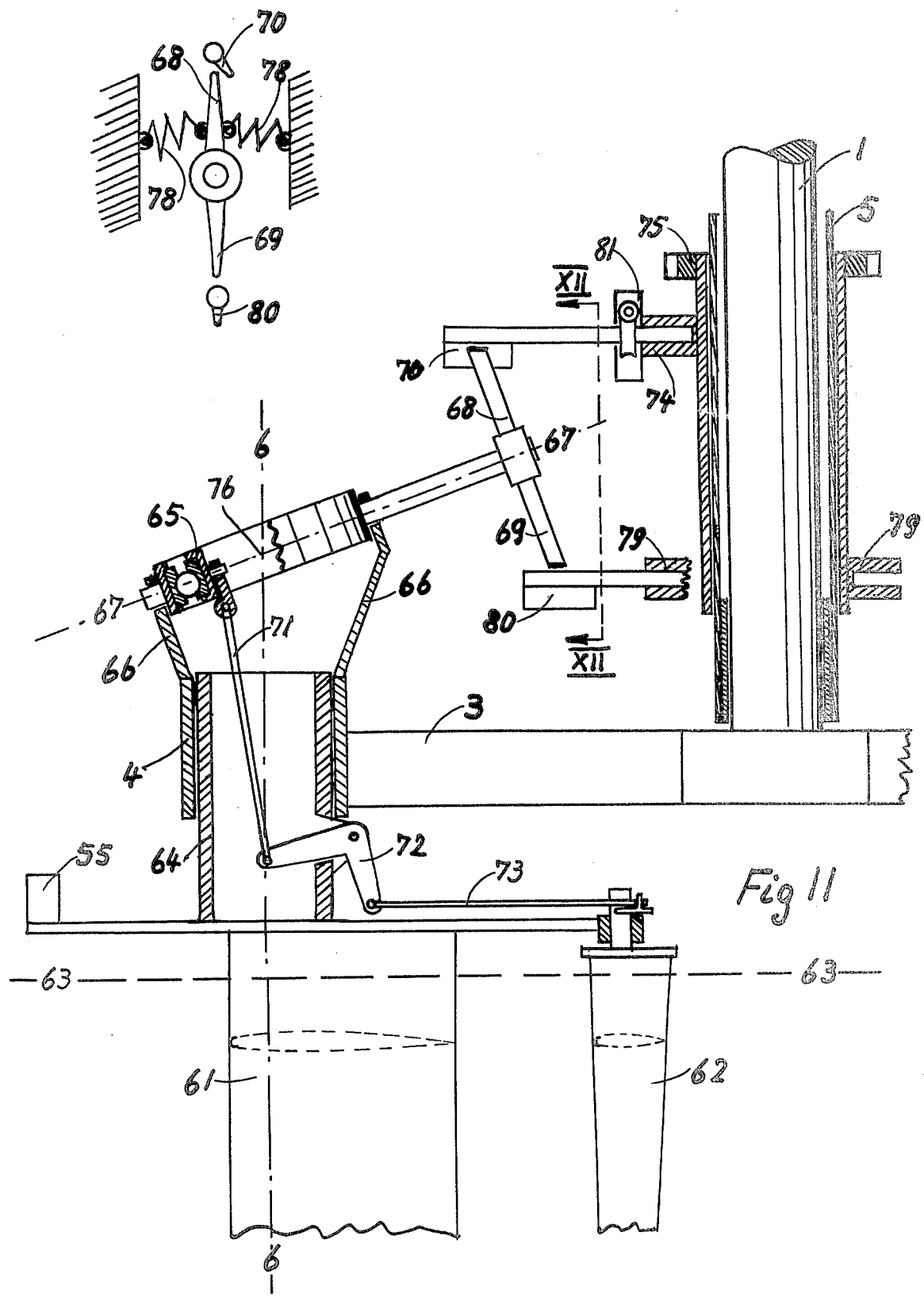

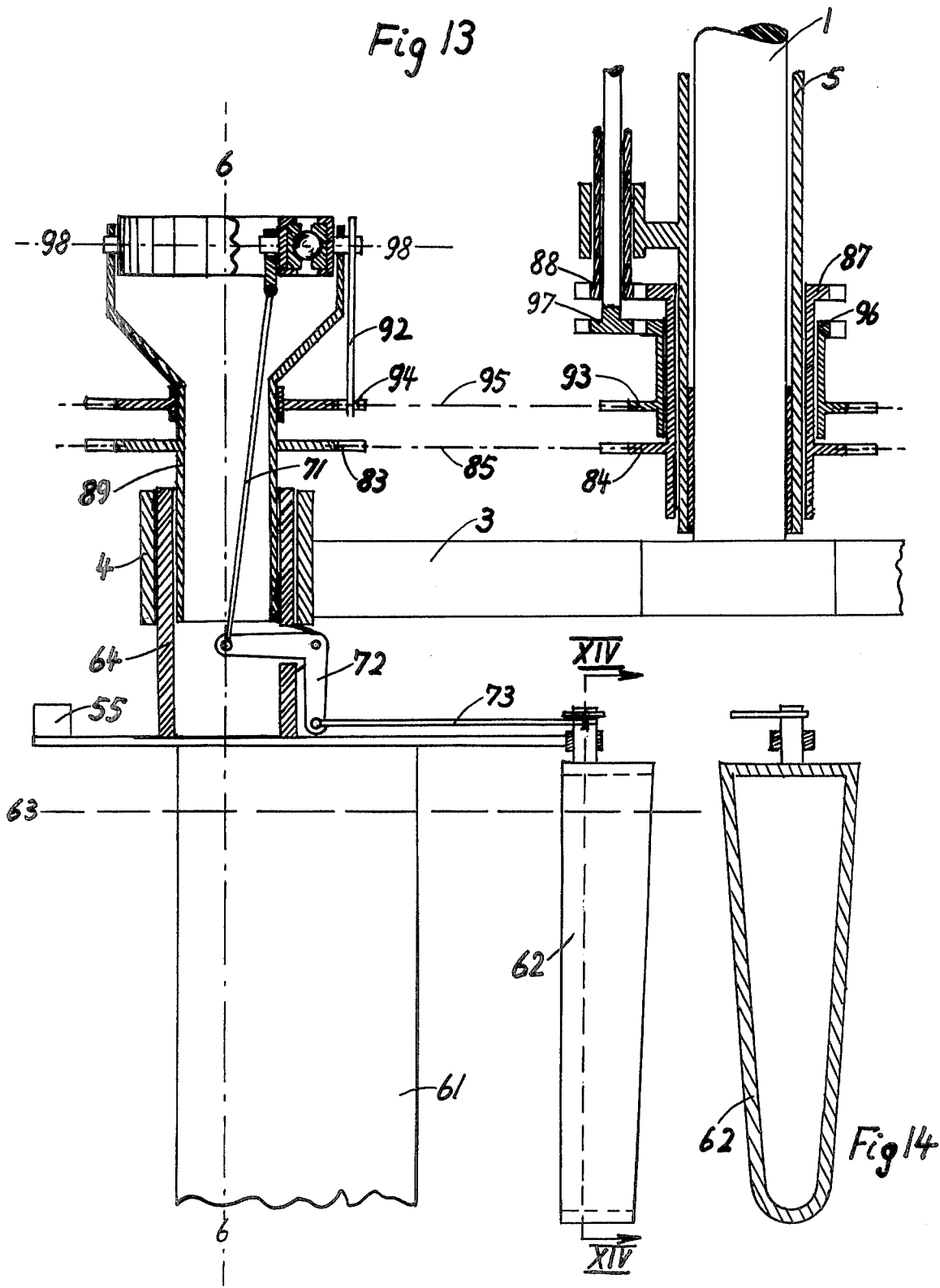

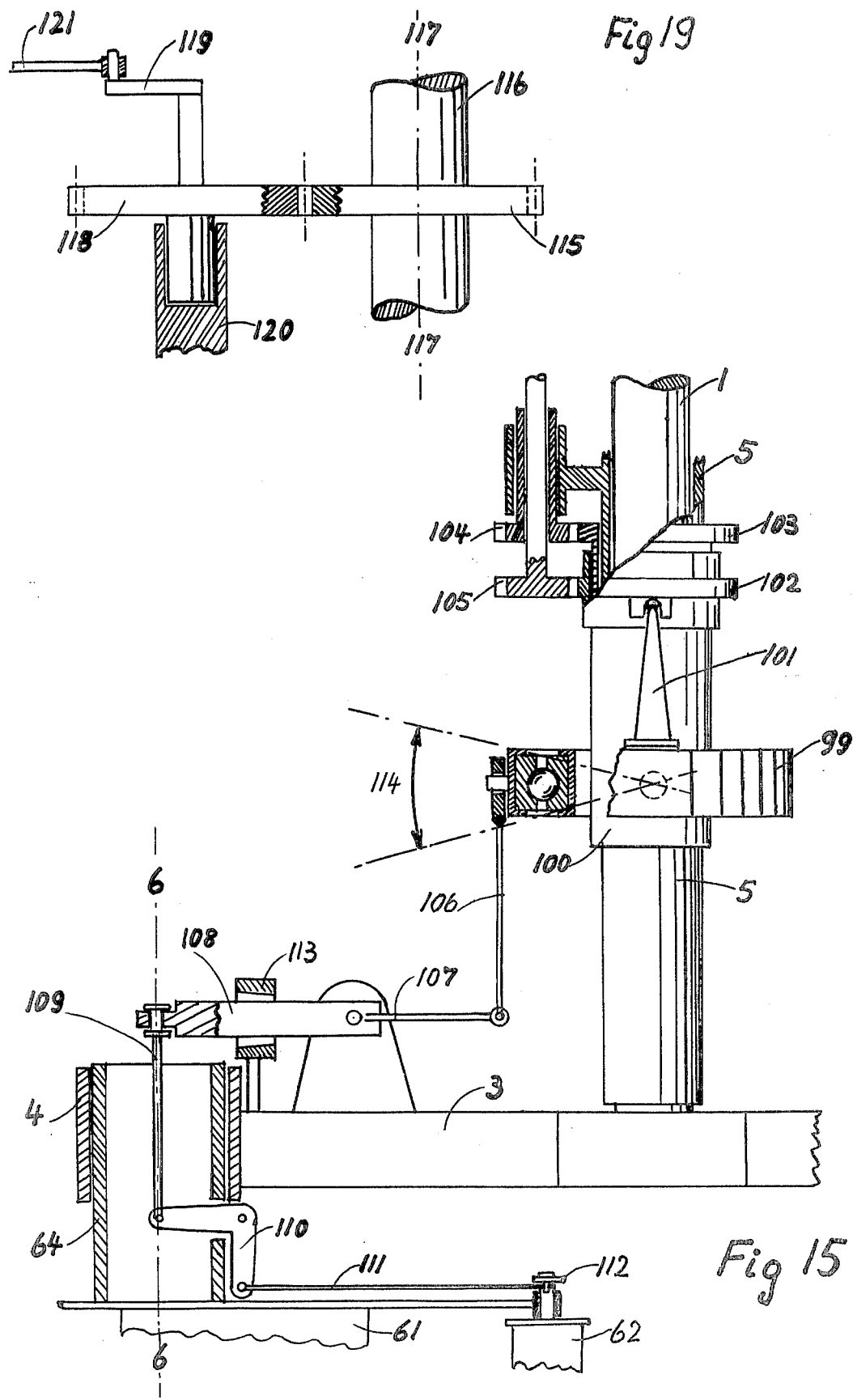

CYCLOIDAL FLUID FLOW ENGINE

This is a continuation in part of patent application entitled "Cycloidal Fluid Flow Engine" and which was filed at the Patent Office on 02/10/77 SerialNo. 767,641 Group Art Unit 343, having common subject matter, now abandoned.

BACKGROUND OF THE INVENTION

1. Field of the Invention

This invention relates to cycloidal fluid flow engines, which have their mainshaft transverse to the external flow, their blades move on a quasi cylindrical orbit around the mainshaft, but with respect to the external flow, the blades follow a path which closely approximates a cycloid or a trochoid. Therefore pitching oscillations of the blades must be maintained continuously. During steady operation, the pitch cycles repeat with each orbit of the blades. Control of the engine output is accomplished by cyclic change of the pitch of each blade. Cycloidal fluid flow engines convert the energy of fluid flow into shaft power and vice versa and are used as turbines and propellers.

2. Description of the Prior Art.

Prior art uses eccentric, cam and springloaded devices for direct control of the pitch angles in cycloidal turbines and propellers, having highly loaded and wearing components and can produce only the accurate pitch for operation at low advance ratio.

Indirect pitch control of freely rotating blades by means of trim tabs, controlled by cam devices, has been proposed, but is insufficient for achieving accurate pitch control throughout the range of advance ratios because a trimtab alone can not provide for the longitudinal stability and control needed for accomplishing the fast pitch changes by a cycloidal turbine even at very low speeds. Furthermore propeller operation is not possible.

Prior art has not employed adequate systems for compensation of inertia interaction effective in indirectly pitch controlled systems, therefore cycloidal engines of high efficiency have not been accomplished.

SUMMARY OF THE INVENTION

The broad objective of my invention is to provide a new, more efficient and versatile cycloidal fluid flow engine having the blades flow dynamically pitch controllable through the full range of external flow conditions and orbital speeds of the blades, applicable for fully controllable turbine and propeller operation including the limit case of no rotation, where the blades aquire the roll of stationary lift producing wings of an aircraft, or rudders of a vessel.

Efficient operation depends basically on the accuracy of the pitching motion of each blade, which is different for each operating condition. This specific objective of the invention is accomplished as follows:

Each blade assembly comprises a wing with or without camber-changing devices and a tail, imparting airplane type pitch stability and control characteristics to the freely rotable blade assembly, optimizing the lift production.

Mass balance is provided by specific blade configurations with integral counter weights, eliminating pitch deviations by g-loads and centrifugal forces.

The phase lag of the pitch cycle is compensated by replacing the sinusoidal deflection pattern of the control surfaces by a square wave pattern and a provision for automatic or manual advance of the reciprocation cycle of the control surfaces.

Another objective of the invention is to provide a cycloidal turbine, which develops high torque at starting conditions or at high advance ratio, meaning that the external flow speed is higher than the orbital speed of the blades, but which can run up to an orbital speed much faster than the external flow, meaning an advance ratio below one, thus providing a selfstarting turbine under load, running up to the most efficient rotational speed.

A further object of the invention is to provide a cycloidal propeller, which accomplishes the transition from the reciprocating motion of the blades centered about their orbit at low advance ratios, to the fish tailing motion at high advance ratio, centered about the line of travel; thus capable of extending the speed range of an air- or waterborn vehicle above the orbital speed of the blades, allowing reduction of absolute blade speed and wave drag or cavitation connected with excessive fluid flow velocities.

Another objective of the invention is achieving transition from rotary wing propulsion to a fixed wing configuration.

Another objective of this invention is the achievement of durability, reliability and cost effectiveness by using standart low friction bearings and other standart parts to meet the most complicated guidance and control requirements for the cycloidal motion of the blades.

A further objective of this invention concerning the use for marine turbines and propellers, is the arrangement of supporting structure and all moveable mechanisms above the water line, requiring only the solid portions of blades and control surfaces to contact the water.

BRIEF DESCRIPTION OF THE DRAWINGS

FIG. 1 shows a side view of a turbine constructed in accordance with my invention demonstrating the arrangement and configuration of the blade assemblies and the reciprocation of the control surfaces by an inclined bearing.

FIG. 2 is a plan view to FIG. 1 showing the wing, tail and variable camber flap deflections during an operating condition at high advance ratio.

FIGS. 3, 4, 5 and 6 demonstrate the operation of an inclined bearing control device with manual and automatic speed and advance control capability.

FIGS. 7 to 10 show alternate blade assembly configurations.

FIGS. 11 and 12 illustrate an example for a cross flow starting and thrust direction control device.

FIGS. 13 and 14 shows a side view of a propeller configuration having synchronized inclined bearing control devices.

FIG. 15 shows a side view of a propeller with one central control device inclined bearing.

FIGS. 16 to 18 explain different orientations for the inclined bearing devices and their effect on the blade orientation.

FIG. 18 shows a planetary gear type control device.

DETAILED DESCRIPTION OF THE DRAWINGS

The mainshaft of the cycloidal fluid flow engine is indicated generally at 1, is mounted in suitable bearings represented at 2 and carries permanently connected radially extending structure, for example arms, generally indicated at 3, which support blade assemblies by means of hubs indicated at 4. Said bearings of the mainshaft are seated in a housing indicated at 5, which links said engine to the power plant or propulsion unit, depending on the mode of operation as a turbine or a propeller. Each of said blade assemblies is mounted freely rotable about axis 6—6 by means of low friction bearings in said hub, having either the hub casing connected to the blade structure and the hub shaft to said radial structure or vice versa. The most importent requirement for efficient operation of said blade assemblies lies in the instant and accurate adjustment capability to the required pitch motion, which changes cyclicly during each orbit of the blade assembly around the mainshaft, but is also different for each operating condition. Therefore a high degree of pitching stability and control, which is only available with airplane type wing and tail configurations, must be achieved. This, combined with other specific means, concerning the configuration, arrangement and control of the blade systems is demonstrated in the following preferred embodiments. For the purpose of explaining the principle of the invention, the description will be limited to the details of only one blade assembly, since the operation of the others is the same.

A important factor in achieving the proper pitch angles lies in optimizing the blade assembly toward high control stability in the sense that a specific angle of attack position without over-travel. This requires a blade assembly geometry of high directional stability requiring that the axis of rotation 6—6 is forward of the center of pressure, the arrangement of the structural components close to the axis of rotation and location of actuators and control surfaces in front of the axis of rotation in order to achieve mass balance with minimum use of penalizing counter weights. Examples for such new and more efficient blade configuration are demonstrated in FIGS. 1 and 2, having elevator 8 in front of wing 7, connected by a forward fuselage 9, which integrally carries a counter weight 10. A variable camber flap 51, reciprocating with the elevator, can be hinged to the trailing edge of the wing. FIGS. 7 and 8 show a blade configuration employing a tail unit consisting of a stabilizer 53 and elevator 54, contributing to better damping of the blade rotation, having higher lift capability than an all movable tail surface. The wing carries a variable camber leading edge 52, reciprocating with elevator 54 which, because of its foreward location, helps reducing counter weight 55. FIGS. 9 and 10 show a blade configuration where a slender wing 56 is rotably mounted close to its aerodynamically neutral axis. Directional stability for said wing is provided by stabilizer 57 attached to rear fuselage 58. The elevator 59 is attached to forward fuselage 60, integrally carrying counter weight 55. Elevator and variable leading edge are counterreciprocating. Said forward and said rear fuselage including tail units can be located at different stations along pivot axis 6—6, the fuselage structure being connected to either the wing itself or to any extension of the wing unit or of said hub elements rotating with the wing as indicated at 4 in FIG. 9, allowing for locating the tail unit at the least interfering positions with bracing wires and other structural members.

The blade assemblies, being symmetric at zero deflection of all control surfaces, follow the cyclic change of the relative flow 18 in FIG. 2, which has the resultant direction of the external flow 16 and the tangential flow 17. This is called the effective pitch motion and produces no lift at the blades. In order to effect an operation of a turbine or propeller, it is necessary to produce an angle of attack $\alpha$, by deflecting control surfaces indicated by tailsurface 8 to one sidewhile traveling the windward half of the blade orbit, and to the other side during the leeward half of the orbit. This is accomplished through linkage 11, 12 and 13, connecting tailsurface 8 with the outer ring of bearing assembly 15. The inner ring of said bearing assembly is seated in inclined position on hub 4, having its tilt axis 19—19 tangentially to the blades orbit and peripenticular to the axis of rotation 6—6. For example, bearing assembly 15 can consist of one or more standart ball bearings and suitable inner and outer bushings. The deflection of the control surfaces originating from the relative motion between linkage 11, rotating with said blade assembly, versus the inclination of bearing 15, whose inner ring is fixed with respect to said tilt axis and rotated with hub 4 in fixed relation to the mainshaft 1. The inclination of said bearing causes the control surfaces connected by said linkage to reciprocate. The deflection of said surfaces vary sinusoidal and proportional to the inclination, determines the magnitude of said angle of attack, thus controlling the torque or thrust produced by a turbine or propeller. At zero inclination, a turbine stops and a propeller thrust vanishes. Reversal of the inclination will reverse the direction of rotation of a turbine or reverse the thrust of a propeller. In FIGS. 3 and 4, bearing assembly 20 is pivotly supported over axis 21—21 by means of bearing 22 located on the inner ring of bearing 20 and bushing 23. For manual control of the inclination, crank 24, attached to the inner ring of bearing 20, is controlled through linkage indicated at 25 and 26, employing a bearing 27 for separation of the rotation of radial structure 3 from the stationary linkage 28, which passes through the center of hollow mainshaft 30 to lever 29. Control of the mainshaft speed is accomplished by a centrifugal governor shown in FIG. 3 in side view and in FIG. 5 in plan view. A weight 30 is rotably mounted to shaft 31 which extends from radial structure 3 and connected through linkage 32 to crank 24. Centrifugal force 35 acts restoring on the inclination of bearing 20. Manual setting of the speed is accomplished by setting controlbracket 34 to a certain preload in spring 35 or 36, which acts on lever 29.

A fixed setting of the tilt-axis 21—21 of bearing assembly 20 tangential to the orbit is correct only for an ideal inertia free engine and does not compensate for a phase lag in the blade rotation cycle. Therefore the proper pitch angle can not be achieved in practice and is more and more missed with increasing speed. This makes control modes, which can provide only a fixed relation between the blade rotation and orbital position unsuitable for higher rotational speeds, where the overall performance rating is best. The phase lag is a consequence of the following factors:

Inertia interaction of the blade systems.
Inertia interaction of the flow medium.
Control stability of the blade assembly.
Mechanical play of linkage and control surfaces.

Compensation for the phase lag is accomplished by this invention through changing the sinusoidal oscillation pattern of the controlsurfaces to a squarewave pattern by tilting bearing assembly 20 to an inclination, producing a larger stroke as can be transmitted to the control surface because of a stroke limiting device 37 in conjunction with flexible linkage as indicated by lever 38 containing a leaf spring 39. This can be further enhanced by shifting the axis of rotation of the controlsurfaces behind their center of pressure, thus making the hinge moments negative.

A further compensation for said phase lag lies in rotational adjustment of bearing assembly 20 with respect to its tangential position of tilt axis 21—21, by rotating bushing 23 by means of crank 40 in FIG. 6, in order to advance the reciprocating cycle of the control surfaces. Manual control by adjustment of bracket 45 acts on crank 40 by means of linkage 41 and 42, employing bearing 43 for separation of rotation and transmission to hollow shaft 44 and lever 50. Automatic advance is acomplished by centrifugal governor, employing weight 48 to actuate crank 40 by means of linkage 49 and in conjunction with the preset loads on springs 46 and 47. The governor systems at each blade assembly are interconnected by their common linkage 27, 28 of the speed control and the common linkage 43,44 of the advance control respectively. Symmetric arrangement of the governors at opposite blades makes these systems insensitive to G-loads.

A further compensation for said phase lag, as well as an improvement in torque or thrust capability of the engine, exists by application of variable camber flaps as indicatet at 51, FIGS. 1 and 2 or variable camber leading edges 52 in FIGS. 7 to 10. These devices change the zero lift angle of the symmetric airfoil of wing 7, thus requiring no, or very little rotation of the wing assembly, which reduces the inertia interaction considerably. The movable tail surfaces must counteract the torque exerted by the variable camber flaps, as readily seen in FIGS. 2, 8 and 10. A compromise exists in using a large stabilizer only, accepting a smaller angle of attack change. Such a configuration would resemble FIG. 10, having elevator 59 removed.

A specific characteristic of cycloidal fluid flow engines as described thus far is, that during propeller operation in a stagnant fluid environment, the blades assemblies remain at zero pitch and in tangential position to their orbit, facing into the circumferential flow, producing no thrust until reciprocation of the control surfaces is properly initiated, causing the blades to aquire a pitch cycle, which produces a flow crosswise to the orbit. This crossflow continues in the direction of initiation, producing a sustained thrust.

FIGS. 11 and 12 illustrate an example for a crossflow starting device on a marine propeller, having wing 61 and elevator 62 extending downward into the water, keeping all other components above the waterline 63 and protected from water spray by a suitable shield. The blade assembly is pivotely mounted about pivot axis 6—6 to a hollow hub shaft 64 rotating in hub casing 4 attached to radial structure 3 extending from mainshaft 1. The inclined bearing 65 is shown in a fixed inclination mount 66. Said bearing arrangement differs from the earlier described inclined bearings by having the outer ring fixed to the radial structure, while the inner ring is rotated by linkage 71 with rotation of the blade assembly about axis 6—6.

For the purpose of starting a crossflow, a tilt axis 67—67 is provided being radially oriented. Crank 68 being deflected by deflector 70 at each passage of the blade assembly, provides for additional inclination of bearing 65, causing actuation of elevator 62 by means of linkage 71, 72 and 73. Deflector 70 is attached to bushing 74, which can be rotably adjusted through gearing 75 into the desired direction of thrust. The temporary inclination of bearing 65, caused by deflector 70, moves the neutral transition point indicated at 76, and linkage 71, being at said transition point when the blade assembly is at zero pitch. Deflector 70, mounted to bracket 77, can be swivelled out of the way of crank 68, as indicated in FIG. 12. Springs 78 keep bearing 65 in untilted position. Crossflow starting action can be enhanced by arranging a second deflection 80 in radially opposed position at bracket 79. This deflector must tilt bearing 65 in opposite direction and deflect crank 69, as indicated in the brakeaway drawing in FIG. 11, in order to keep the induced flows proceeding in the same direction. The activation of the cross flow can be controlled by remote sensors in the external flow, switching an electromechanical actuator 81 for rotating said deflectors into or out of the path of said cranks.

The effect of cross flow starting serves not only the origination of thrust from zero pitch operation, but is also providing for directional thrust control by rotating the complete deflector assembly by means of gearing 75. An alternate method of temporarely changing the neutral position 76 of the inclined bearing 65 is available by rotational deflection of inclination mount 66 about pivot axis 6—6 instead of bearing 65 about axis 67—67.

Other concepts for controlling the direction and also the magnitude of propeller thrust is described in FIGS. 13, 14 and 15.

One alternate embodiment preferably for propeller configurations is illustrated in FIGS. 13 and 14. In FIG. 13, a rotational motion of the inclined bearing 82 relative to radial structure 3 is provided by a mechanical, electrical or hydraulic gear train, like bevelgearing or remote indexing systems, represented by a chain drive consisting of sprocket wheels 83 and 84, having equal pitch circles, and connected by a chain as indicated at 85. Sprocket wheel 84 is mounted to bushing 86 which can be rotated about the housing 5 through gearing indicated at 87 and 88. Sprocket wheel 83 is mounted to bushing 89, which is rotably mounted into hollow hub shaft 64 of the blade assembly, and which carries the tiltable bearing assembly 82. Said chaindrive keeps bearing 82 rotationally fixed with respect to bushing 86, being mounted on engine housing 5 and controlable by means of gears 87 and 88. Gear 88 is manually or automatically by sensors of the external flow direction controlled for directing the thrust during propeller operation, or in case of turbine operation for aligning the blade assemblies with the external flow.

Said control of the inclination of bearing assembly 82 in FIG. 13 is achieved by rotation of gear 97, which causes rotation of sprocket wheels 93 and 94 connected by chain 95. Crank 92, which is in engagement with sprocket wheel 94, rotates bearing 82 about tilt axis 98—98. FIG. 14 demonstrates that the required stiffnes of cantilevered control surfaces can be accomplished by applying a boxtail type configuration.

In FIG. 15 another configuration is described, having one centrally located inclining bearing assembly 99, serving the control of all control surfaces at all blade assemblies. The inner ring of bearing 99 is mounted on a pivot perpendicular bushing 100. Crank 101, which is attached to the inner ring of said bearing is engaged to gear 102. Rotation of said gear relative to bushing 100 will rotate crank 101 and tilt bearing 99 within the angulare range indicated at 114. Gear 103 is attached to bushing 100, which is rotably mounted on housing 5. Gear 104 is directly or remotely actuated for controlling the direction of thrust, or in case of turbine operation, the alignment of the blade assemblies to the direction of external flow. Gear 105 is rotated with gear 104, retardation or advance with respect to gear 104 causes movement of crank 101, causing control of the magnitude of thrust and thrust reversal. The outer ring of bearing 99 is connected by means of linkage 106 to 111 and to crank 112 of elevator 62. Square wave pattern for the reciprocation of the control surfaces can be produced by mounting a flexible member into the linkage as indicated by a leaf spring 107 in conjunction with a stroke limiter 113.

In FIG. 19 an alternate embodiment for a control device for repiprocation of said control surfaces is illustrated, employing a planetary gear arrangement having gear 115 mounted to a bushing or shaft indicated at 116 and centered about an axis 117—117, representing pivot axis 6—6 or the axis of the mainshaft. A gear 118, having equal pitch diameter with gear 115, is rotably mounted to bracket 120 and orbits with said wing unit, or said arms respectively around gear 115. Crank 119 with linkage 121 interconnects to the linkage operating the control surfaces.

In FIGS. 16 to 18, the mode of operation for various arrangements of inclined bearings is illustrated, explaining the consequences of the chaindrive introduced in FIG. 13. In the illustrations, the inclined bearing is symbolized by a circle, indicating the tilted downward side by the black half of the circle, while the upward side is left white, indicating how elevator 62 must be deflected. The deflection is zero when wing 61 is parallel to the diameter separating the black and the white semicircle. FIG. 16 corresponds to a propeller as shown in FIG. 11, having a cross flow starting device, but each inclined bearing is mounted with a fixed axis of inclination tangential to the radial structure, as illustrated in FIGS. 1 and 2 at 19—19. The operating condition shown in FIG. 16 is in the propeller mode, the blade assemblies propelled along their orbit by applied torque 90, producing an external flow 16 and a thrust 91. In FIG. 17 is demonstrated that an identical operating condition exists having the inclined bearings in parallel orientation as accomplished by chaindrive 85 in FIG. 13. While the propeller configuration of FIG. 16 will also work in the turbine mode, the configuration of FIG. 17 will transform to a non rotating configuration of FIG. 18 as soon as the applied torque 90 ceases, but the external flow 16 is maintained. The transition from low to high Advance Ratio as the orbital velocity decreases, and finally to an infinite Advance Ratio when the propeller stops rotation, will proceed automatically. For example, an aircraft employing rotating wing propulsion as described in FIG. 13 for vertical ascent, can make the transition to horizontal flight with stationary wings, by simply starting horizontal thrusters in order to produce a horizontal flow 16 in FIG. 18 and cut off torque 90 indicated in FIG. 17. During fixed wing operation, control of the bearing inclination as shown in FIG. 13 at gear 97, will control the angle of attack of all stationary wings 61. This would also serve as rudder control for a ship after the propeller has been stopped. Furthermore lift control can be achieved by blocking the freewheeling of the propeller and the bladesystems, by for instance applying brakes, and control the attitude by an aircraft configuration with normal empennage.

Obviously many modifications and variations of the present invention are possible in the light of the above teachings. The control systems for instance, providing the proper reciprocating actuation of the control surfaces, can be mechanically modified, but also routinely replaced by electro mechanical systems employing sliprings or switches, reversing polarity depending on the relative rotation between the engine housing, the radial structure and the blade systems. It is therefore to be understood, that within the scope of the appended claims, the invention may be practiced otherwise but specifically described.

I claim:

1. A cycloidal fluid flow engine comprising:
   a mainshaft and a plurality of angularly spaced arms extending radially outward from said mainshaft;
   a like plurality of blade assemblies, each comprising:
   interconnected, but spaced, aerodynamic wing unit and aerodynamic tail unit;
   a said wing unit of each blade assembly being freely rotable mounted on an end region of one of said arms about a pivot axis upstream of the center of pressure of said blade assembly, quasi parallel with the axis of said mainshaft; and
   each said tail unit consisting of tail surfaces being connected to said wing unit by at least one fuselage; said tailsurfaces being fixed stabilizers and movable elevators having the elevator hinge axis quasi parallel with said pivot axis of said wing unit; and
   control means for varying the angle between (1) a plane along the surface of said wing unit, and (2) a plane along an elevator of said tail surfaces, and (3) a plane along a camber control surface of said wing unit, as a function of the relative rotational position between said control means and said blade assemblies.

2. A cycloidal fluid flow engine as set forth in claim 1, wherein said blade assembly has a tail unit consisting of an elevator connected upstream to said wing unit by a forward fuselage containing integrally the counterweight for mass balance of said blade assembly about said pivot axis.

3. A cycloidal fluid flow engine as set forth in claim 2, wherein said wing unit carries a variable camber flap reciprocating with said elevator.

4. A cycloidal fluid flow engine as set forth in claim 1, wherein said blade assembly has a tail unit connected downstream to said wing unit by a rear fuselage, said tail unit being a stabilizer plus elevator.

5. A cycloidal fluid flow engine as set forth in claim 4, wherein said wing unit carries a variable camber leading edge, reciprocating with said elevator.

6. A cycloidal fluid flow engine as set forth in claim 2, wherein said blade assembly has an additional rear fuselage carrying a stabilizer.

7. A cycloidal fluid flow engine as set forth in claim 6, wherein said wing unit carries a variable camber leading edge, reciprocating with said elevator.

8. A cycloidal fluid flow engine as set forth in claim 6, wherein said tail units are connected to an extention of the hub of said wing unit.

9. A cycloidal fluid flow engine as set forth in claim 1, wherein said blade assembly has a wing unit with one variable camber control flap and a tail unit consisting of a rear fuselage and a fixed stabilizer and wherein said control means reciprocate said variable camber control surface as the sole means for producing alternating lift cycles on said wing unit.

10. A cycloidal fluid flow engine as set forth in claim 1, wherein said control means comprise:
    a plurality of bearing assemblies, each having an inner ring member freely rotable in an outer ring member, said ring members interlocking each other radially and axially at minimal tolerance; and coupling means selectively interconnecting one said ring member with said elevators and said camber control surfaces, representing the blade control surfaces.

11. A cycloidal fluid flow engine as set forth in claim 10, wherein said inner ring member is centered about said pivot axis and seated in inclined position on the hubshaft extending from said end region of one of said arms, said inner ring member having its tilt axis diametrically through its neutral plane and being positioned tangentially to the orbit of said blade assembly and perpenticular to said pivot axis.

12. A cycloidal fluid flow engine as set forth in claim 10, wherein said coupling means consists of linkage pivotly interconnecting said outer ring member with said control surfaces, said linkage being pivotly supported by said blade assembly.

13. A cycloidal fluid flow engine as set forth in claim 12, wherein said linkage closest to said outer ring member comprises a double hinge having one axis extending radially from the periphery of said outer ring member and the other axis in tangential direction, providing universal joint action.

14. A cycloidal fluid flow engine as set forth in claim 12, wherein said coupling means have a flexible link in conjunction with a stroke limiting device.

15. A cycloidal fluid flow engine as set forth in claim 10, wherein said inner ring member is pivotly supported about said tilt axis, having a larger inside diameter then its supporting bushing in order to provide clearance to tilt, said bushing being rotably mounted on said hubshaft.

16. A cycloidal fluid flow engine as set forth in claim 15, wherein said inner ring member has a crank acting about said tilt axis, said crank being linked to a centrifugal speed governor as well as to a central manual control device for rotational speed control of said mainshaft; said central speed control device being common to all other speed governors of said engine.

17. A cycloidal fluid flow engine as set forth in claim 15, wherein said supporting bushing has a crank being linked to a centrifugal phase governor as well as to a central manual control device imparting an angular bias to said tangential position of said tilt axis in order to compensate for phase lag; said central phase control device being common to all other phase governors of said engine.

18. A cycloidal fluid flow engine as set forth in claim 10, wherein each of the said bearing assemblies comprises:
a said outer ring member, pivotly mounted at a fixed tilt angle in an inclination mount, said outer ring having a shaft with a pair of cranks, and
a said inner ring member being pivotly connected by said universal joint action to said coupling means.

19. A cycloidal fluid flow engine as set forth in claim 18, wherein deflector bars extending radially opposed from a turnable bushing on the housing of said mainshaft, said bars having pivotable deflectors effecting interference with said cranks; said bushing being geared to controls directing the thrust vector of said engine.

20. A cycloidal fluid flow engine as set forth in claim 19, wherein said control means are located outside the blades operational region and beyond the plane of said arms supporting said blaide assemblies, having said coupling means installed through a hollow shaft in said hub.

21. A cyloidal fluid flow engine as set forth in claim 10, wherein said control means include phase adjustment means for varying said angular bias continnously and synchronously with the rotation of said arms about said mainshaft comprising:
a said bearing assembly, tiltably mounted into a bushing by means of diametrically opposed lugs on said outer ring member, said bushing being rotably mounted into the hollow hub shaft of said blade assembly,
a rotably mounted support on the housing of said mainshaft,
a gear train synchronizing said support on said housing with said support, enabling rotation of said tilt axis about said pivot axis,
means for remotely rotating said support on said housing for controlling the direction of thrust or the blade alignment to the external flow respectively,
means for controlling the tilt angle of said bearing assembly by a second synchronizing gear train transmitting the relative rotation of a second support being mounted pivotly and coaxially on said support on said housing to a crank on a said lug on the outer ring member, effecting control of the magnitude and reversal of propeller thrust or turbine power and direction of rotation respectively.

22. A cycloidal fluid flow engine as set forth in claim 21, wherein said control surfaces are of boxtail type configuration.

23. A cycloidal fluid flow engine as set forth in claim 10, wherein said control means comprises:
a said bearing assembly positioned around said axis of said mainshaft having an
inner ring member tiltably mounted to a first bushing being rotably mounted on the housing of said mainshaft, said inner ring member carrying a crank interlocking with a second bushing being coaxial and rotably on said first bushing and relative rotation of said bushings is tilting said crank effecting control of said tilt angle, and a
outer ring member interconnected to the linkage of each said blade assembly, said linkage transmitting the rotation of said arms to said outer ring member and also reciprocation to said control surfaces,
means for remotly rotating said first bushing together with said second bushing and for rotating said bushings relative to each other for control of direction, magnitude and reversal of thrust and for alignment to the external flow and control of turbine power and direction of rotation respectively.

24. A cycloidal fluid flow engine as set forth in claim 1, wherein said control means consist of gears of equal pitch diameter in a planetary gear arrangement, having the center gear positioned about said pivot axis, while the planetary gear orbits with said wing unit, said orbiting gear carrying a crank operrating said coupling means.

25. A cycloidal fluid flow engine as set forth in claim 1, wherein said control means consist of gears of equal pitch diameter in a planetary arrangement, having the center gear positioned at out said mainshaft, while the planetary gear orbits with said arms, said orbiting gear carrying a crank operating said coupling means.

26. A cycloidal fluid flow engine as set forth in claim 21, wherein all said tilt axis of all bearing assemblies employed in said engine are maintained in parallel orientation to each other by said synchronizing gear train.

27. A cycloidal fluid flow engine as set forth in claim 1, wherein said mainshaft and each said freely rotable mounted wing unit have means blocking their rotation with respect to said housing of the mainshafts.

* * * * *